United States Patent
Ohnishi (10) Patent No.: US 7,181,552 B2
(45) Date of Patent: Feb. 20, 2007

(54) STORAGE DEVICE AND PROCESSING METHOD

(75) Inventor: Shinji Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 10/774,862

(22) Filed: Feb. 9, 2004

(65) Prior Publication Data

US 2004/0215786 A1  Oct. 28, 2004

(30) Foreign Application Priority Data

Feb. 12, 2003  (JP) ............................. 2003-033781

(51) Int. Cl.
*G06F 3/00* (2006.01)
*G06F 13/14* (2006.01)
*G06F 12/00* (2006.01)

(52) U.S. Cl. .............................. 710/14; 710/8; 710/18; 710/31; 710/38

(58) Field of Classification Search .................. 710/8, 710/14, 15, 38, 62
See application file for complete search history.

(56) References Cited

U.S. PATENT DOCUMENTS

| | | | |
|---|---|---|---|
| 5,634,040 A | * | 5/1997 | Her et al. .................... 345/629 |
| 6,098,098 A | * | 8/2000 | Sandahl et al. ............. 709/221 |
| 6,202,153 B1 | * | 3/2001 | Diamant et al. ............... 726/35 |
| 6,345,368 B1 | * | 2/2002 | Bergsten ....................... 714/11 |
| 2002/0120706 A1 | * | 8/2002 | Murphy ....................... 709/208 |
| 2003/0145086 A1 | * | 7/2003 | O'Reilly ..................... 709/226 |

FOREIGN PATENT DOCUMENTS

JP  08-116481  5/1996

* cited by examiner

*Primary Examiner*—Kim Huynh
*Assistant Examiner*—Scott Sun
(74) *Attorney, Agent, or Firm*—Morgan & Finnegan, LLP

(57) ABSTRACT

Provided is a storage device that includes a first interface unit configured to connect to an external apparatus, a second interface unit configured to connect to a network, and a control unit which control the storage device. The control unit determines whether the external apparatus is connected to the first interface unit. The control unit selects a first operating mode where the storage device is used by the external apparatus and the second interface unit is disabled, if the control units determines that the external apparatus is connected to the first interface unit. The control unit selects a second operating mode where the storage device operates as a file server and the second interface is enabled, if the control unit determines that the external apparatus is not connected to the first interface unit.

8 Claims, 6 Drawing Sheets

FIG. 1A

DAS MODE

FIG. 1B

NAS MODE

DAS MODE

FIG. 4B

NAS MODE

STORAGE DEVICE AND PROCESSING METHOD

CLAIM OF PRIORITY

The present application claims priority under 35 U.S.C. §119 from Japanese Patent Application No. 2003-033781, entitled "A Storage Apparatus and A Processing Method Therefor" and filed on Feb. 12, 2003, the entire contents of which are hereby incorporated by reference herein.

FIELD OF THE INVENTION

This invention relates to a storage device that operates as a storage device of a video apparatus, and to a processing method in this storage device.

BACKGROUND OF THE INVENTION

An external storage device for a video apparatus such as a digital video camera is known in the art, the storage device storing digital video data that has been output from the video apparatus. (For example, see the specification of Japanese Patent Application Laid-Open No. 8-116481).

Even though the conventional storage device is capable of operating as a storage device exclusively for a video apparatus, it cannot operate in the manner of an NAS (Network Attached Storage). NAS is a storage device capable of being connected directly to a network and can operate as a file server. If the storage device could operate in the manner of the NAS, then merely connecting it to a network would make it possible to supply a network device in the network with digital video data that has been stored in the storage device. However, the conventional storage device cannot operate in this fashion.

Further, the conventional storage device cannot be switched automatically between an operating mode in which it operates as a storage device exclusively for a video apparatus and an operating mode in which it operates as a file server.

SUMMARY OF THE INVENTION

Accordingly, an object of the present invention is to provide a storage device that can operate as a storage device exclusively for a video apparatus and also as a file server.

By way of example, there is provided a storage device comprising:

a first interface unit configured to connect to an external apparatus, a second interface unit configured to connect to a network, and a control unit which control the storage device, wherein the control unit determines whether the external apparatus is connected to the first interface unit, the control unit selects a first operating mode where the storage device is used by the external apparatus and the second interface unit is disabled, if the control units determines that the external apparatus is connected to the first interface unit, the control unit selects a second operating mode where the storage device operates as a file server and the second interface is enabled, if the control unit determines that the external apparatus is not connected to the first interface unit.

Further, by way of example, there is provided a method of controlling a storage device, the storage device including a first interface unit configured to connect to an external apparatus, a second interface unit configured to connect to a network, and a control unit which control the storage device, the method comprising the steps of:

determining whether the external apparatus is connected to the first interface unit, selecting a first operating mode where the storage device is used by the external apparatus and the second interface unit is disabled, if the control units determines that the external apparatus is connected to the first interface unit, selecting a second operating mode where the storage device operates as a file server and the second interface is enabled, if the control unit determines that the external apparatus is not connected to the first interface unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described with reference to the drawings.

(First Embodiment)

Figure 1A:
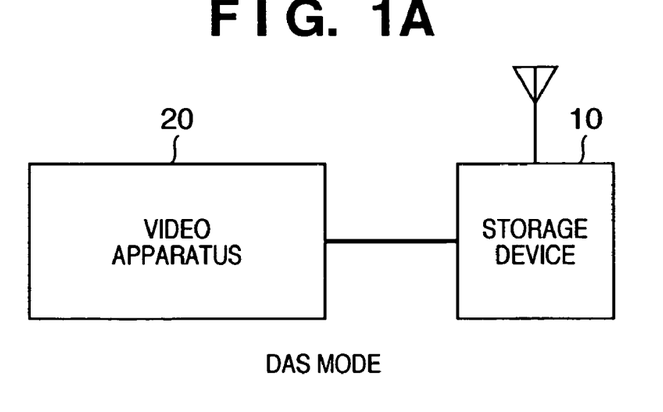
FIGS. 1A and 1B are diagrams illustrating modes of use of a storage device according to a first embodiment of the present invention.
Figure 1B:
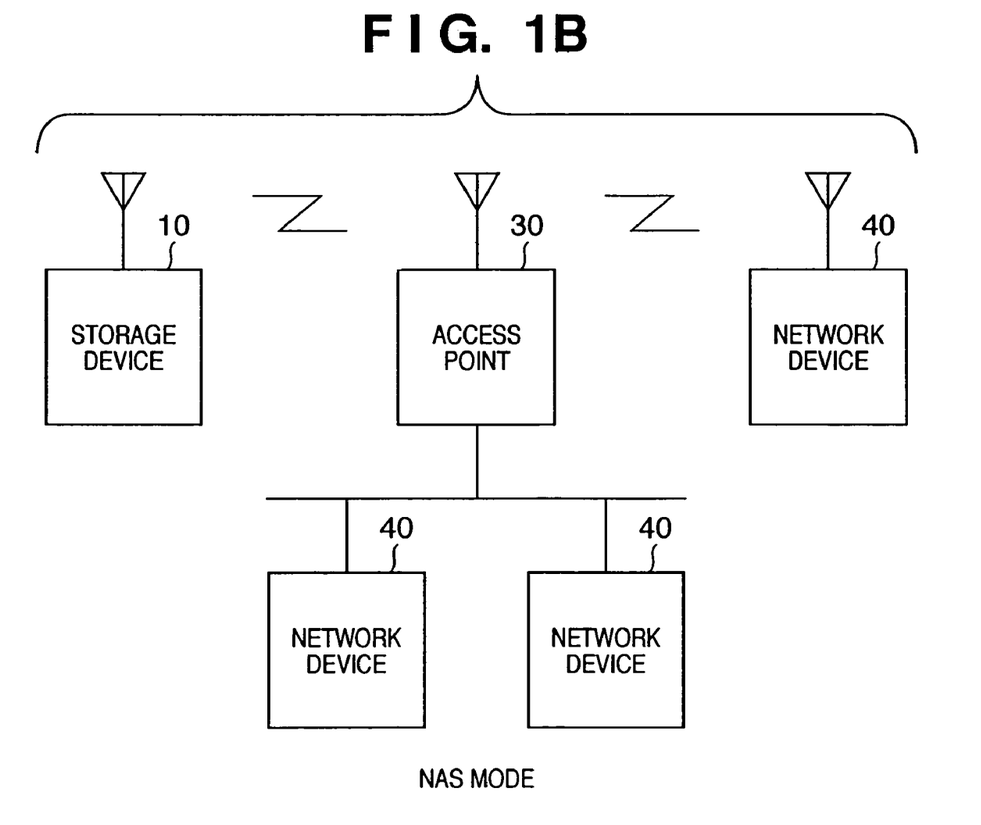

First, an example of modes of use of a storage device 10 according to a first embodiment will be described with reference to FIGS. 1A and 1B. FIG. 1A is a diagram illustrating an example in which the storage device 10 is utilized in a DAS (Direct Attached Storage) mode, and FIG. 1B is a diagram illustrating an example in which the storage device 10 is utilized in an NAS (Network Attached Storage) mode.

The storage device 10, which has the DAS mode and the NAS mode, implements these modes selectively. The DAS mode is an operating mode in which the storage device 10 is caused to operate as a storage device dedicated to a video apparatus 20. The DAS mode is an operating mode selected automatically and implemented when the storage device 10 is loaded in the video apparatus 20 or connected to the video apparatus 20 via a cable. The NAS mode is an operating mode in which the storage device 10 is connected to a network automatically via an access point 30 and caused to operate as a file server. In other words, the NAS mode is an operating mode in which the storage device 10 is caused to operate as NAS (Network Attached Storage). The NAS mode is an operating mode selected automatically and implemented when the storage device 10 is disconnected from the video apparatus 20. When the storage device 10 is in the NAS mode, network devices 40 are capable of utilizing the storage device 10 via the access point 30. The video apparatus 20 is an apparatus such as a digital video recorder or a digital video camera. When the storage device 10 has been connected to the video apparatus 20, digital video data from the video apparatus 20 is stored in the storage device 10. The access point 30 is one in a wireless network such as a wireless LAN.

This embodiment has been described taking a video apparatus as an example of an apparatus to which the storage device 10 is connected. However, this does not impose any limitation upon the present invention and the apparatus may be any that executes prescribed data processing.

The main structure of the storage device 10 according to the first embodiment will now be described with reference to FIG. 2.

Figure 2:
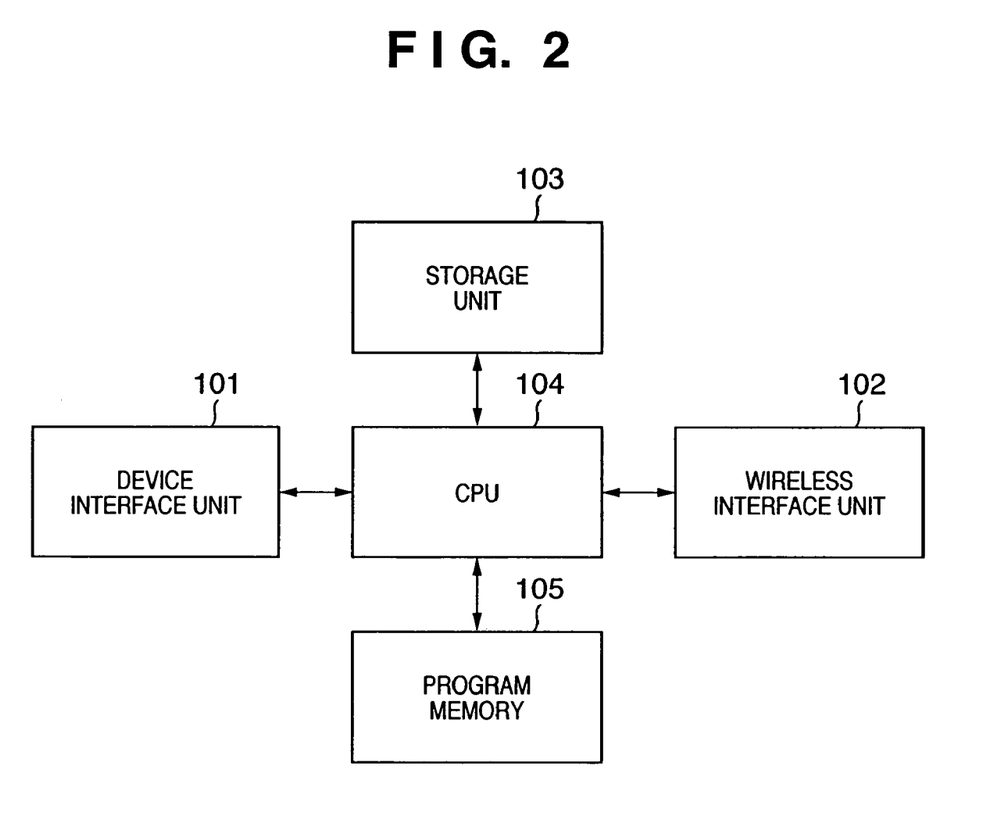
FIG. 2 is a block diagram illustrating the main structure of a storage device according to the first embodiment.

In FIG. 2, a device interface unit 101 makes it possible to communicate with the video apparatus 20, and a wireless interface unit 102 makes it possible to communicate with the access point 30 in the wireless network. A storage unit 103 executes processing for writing digital video data obtained from the device interface unit 101 or wireless interface unit 102 to a randomly accessible storage medium, and processing for supplying digital video data, which has been read out of a randomly accessible storage medium, to the device interface unit 101 or wireless interface unit 102. The storage unit 103 is also capable of providing the function of a file server via the wireless interface unit 102. A CPU (Central Processing Unit) 104 controls the functions of the storage device 10 and performs management in accordance with a program stored in a program memory 105.

Processing for changing over the operating mode implemented in the storage device 10 will now be described with reference to the flowchart of FIG. 3. It should be noted that in processing for changing over the operating mode, it is assumed that the processing in the CPU 101 is executed in accordance with the program stored in the program memory 105.

Step S301: If the user has connected the storage device 10 to the video apparatus 20, then the device interface unit 101 detects this fact electrically or by using a switch and notifies the CPU 104 of the fact that the storage device 10 has been connected to the video apparatus 20. In accordance with this notification from the device interface unit 101, the CPU 104 determines whether the storage device 10 has been connected to the video apparatus 20. If it is determined that the storage device 10 has been connected to the video apparatus 20, then control proceeds to step S302. On the other hand, if it is determined that the storage device 10 has not been connected to the video apparatus 20, then control proceeds to step S305.

Step S302: The CPU 104 switches the operating mode of the storage device 10 to the DAS mode.

Step S303: The CPU 104 disables the function of the wireless interface unit 102 and disconnects the storage device 10 from the network. The CPU 104 then controls the storage device 10 in such a manner that the storage device 10 will operate as a storage device exclusively for the video apparatus 20.

Step S304: If the user has removed the storage device 10 from the video apparatus 20, the device interface unit 101 detects this fact electrically or by using a switch and notifies the CPU 104 of the fact that the storage device 10 has been disconnected from the video apparatus 20. In accordance with such notification from the device interface unit 101, the CPU 104 determines whether the storage device 10 has been disconnected from the video apparatus 20. It is determined that the storage device 10 has been disconnected from the video apparatus 20, control proceeds to step S305.

Step S305: The CPU 104 switches the operating mode of the storage device 10 to the NAS mode.

Step S306: The CPU 104 enables the function of the wireless interface unit 102 and connects the storage device 10 to the network via the access point 30. The CPU 104 then controls the storage device 10 in such a manner that the storage device 10 will operate as a file server connected directly to the network. By execution of such processing, each network device 40 is capable of utilizing the storage device 10 via the access point 30, desired digital video data can be read out of the storage unit 103, and desired digital video data can be written to the storage unit 103.

Figure 3:
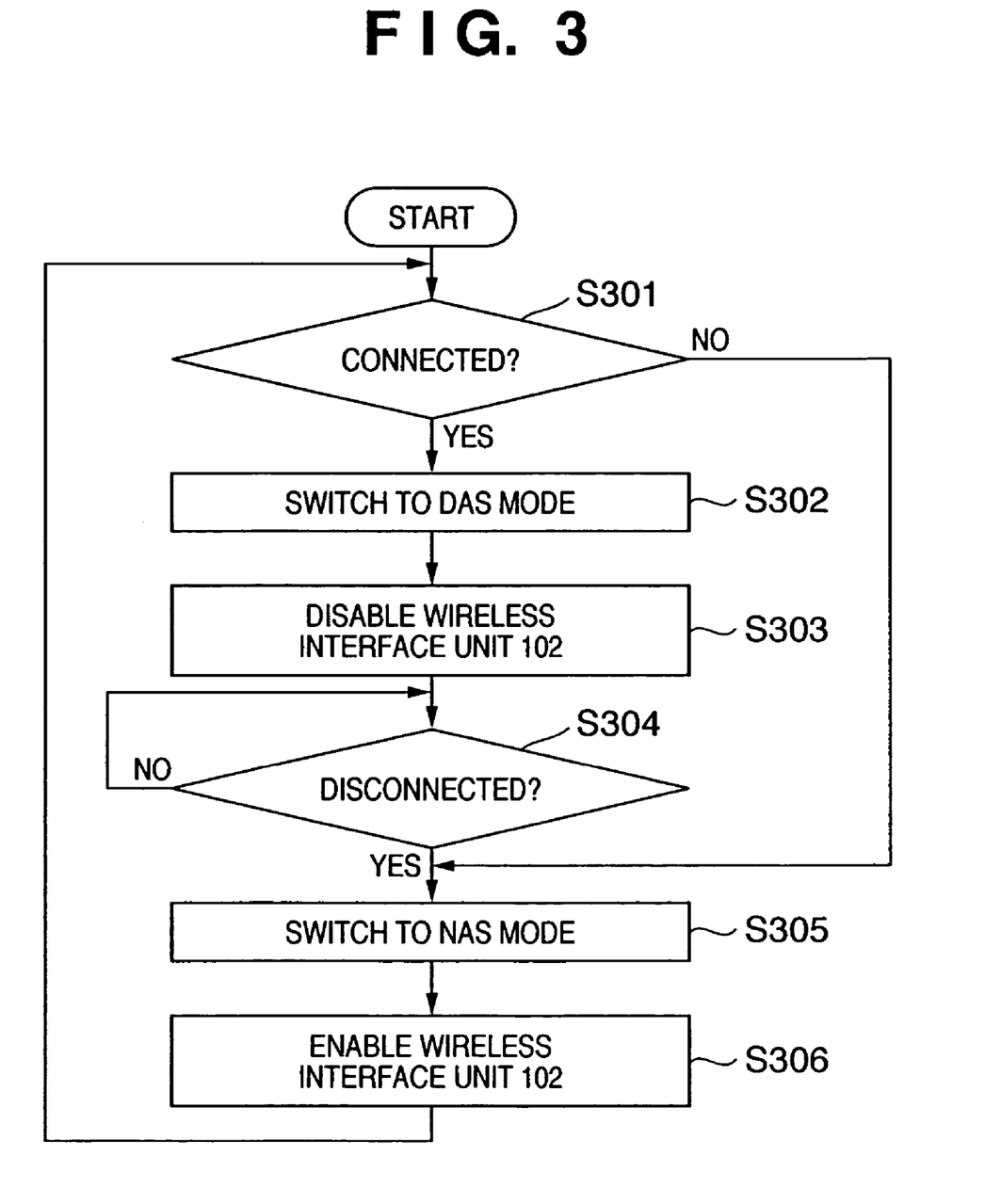
FIG. 3 is a flowchart illustrating operating-mode changeover processing executed in the storage device of the first embodiment.

As will be understood from the flowchart of FIG. 3, even if the storage device 10 is operating in the NAS mode, it will switch over to the DAS mode automatically if it is connected to the video apparatus 20. Accordingly, this embodiment is such that the DAS mode has a higher priority than the NAS mode. By thus giving the DAS mode a higher priority than the NAS mode, a switch will be made to the DAS mode even in an environment in which the NAS mode is capable of operating. This is very convenient in that by merely connecting the storage device 10 to the video apparatus 20, the user can make the changeover without being aware of the changeover. It should be noted, however, that the above does not negate the possibility of making the NAS mode higher in priority than the DAS mode; it is possible to change the priority by a setting.

Thus, in accordance with the storage device 10 of the first embodiment, the storage device 10 can operate as a storage device dedicated to the video apparatus 20 and also as a file server connected directly to a network.

Further, in accordance with the storage device 10 of the first embodiment, the operating mode of the storage device 10 can be selected to be the DAS mode or NAS mode in dependence upon whether the storage device 10 has been connected to a video apparatus. As a result, it is possible to switch automatically between an operating mode in which the storage device operates as a storage device dedicated to the video apparatus 20 and an operating mode in which the storage device operates as a file server connected directly to a network.

Further, in accordance with the storage device 10 of the first embodiment, the device can be connected to a network using the wireless interface unit 102. As a result, the storage device 10 can be connected to the network in simple fashion merely by disconnecting it from the video apparatus 20.

Further, in accordance with the storage device 10 of the first embodiment, the storage device 10 can operate as a file server connected directly to a network when the NAS mode is in effect. This means that digital video data that the video apparatus 20 has stored in the storage device 10 can be supplied to a network device that requests this data.

It should be noted that in the storage device 10 of the first embodiment may be so adapted that the area used by the storage unit 103 is split into areas, with a certain area being used when the DAS mode is in effect and another area being used when the NAS mode is in effect. More specifically, the storage unit 103 is divided up into a plurality of areas of use. If the DAS mode is in effect, then an area A, for example, is used. If the mode has been switched from the DAS mode to the NAS mode, then the area used is switched from area A to area B. The area B may be further subdivided into a plurality of areas of use and may be managed on a per-network-device basis.

(Second Embodiment)

According to the first embodiment, the arrangement described is such that the DAS mode or NAS mode is changed over in dependence upon whether the storage device has been connected to a video apparatus. According to a second embodiment, an arrangement in which the DAS mode or NAS mode is changed over in accordance with a mode changeover command obtained from a video apparatus will be described.

Figure 4A:
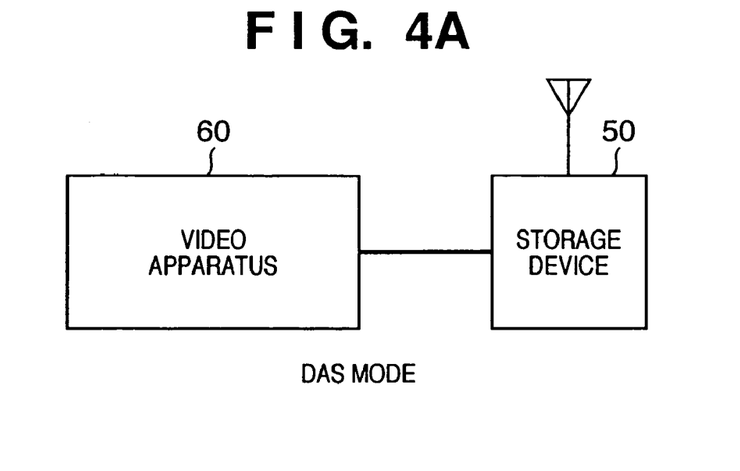
FIGS. 4A and 4B are diagrams illustrating modes of use of a storage device according to a second embodiment of the present invention.
Figure 4B:
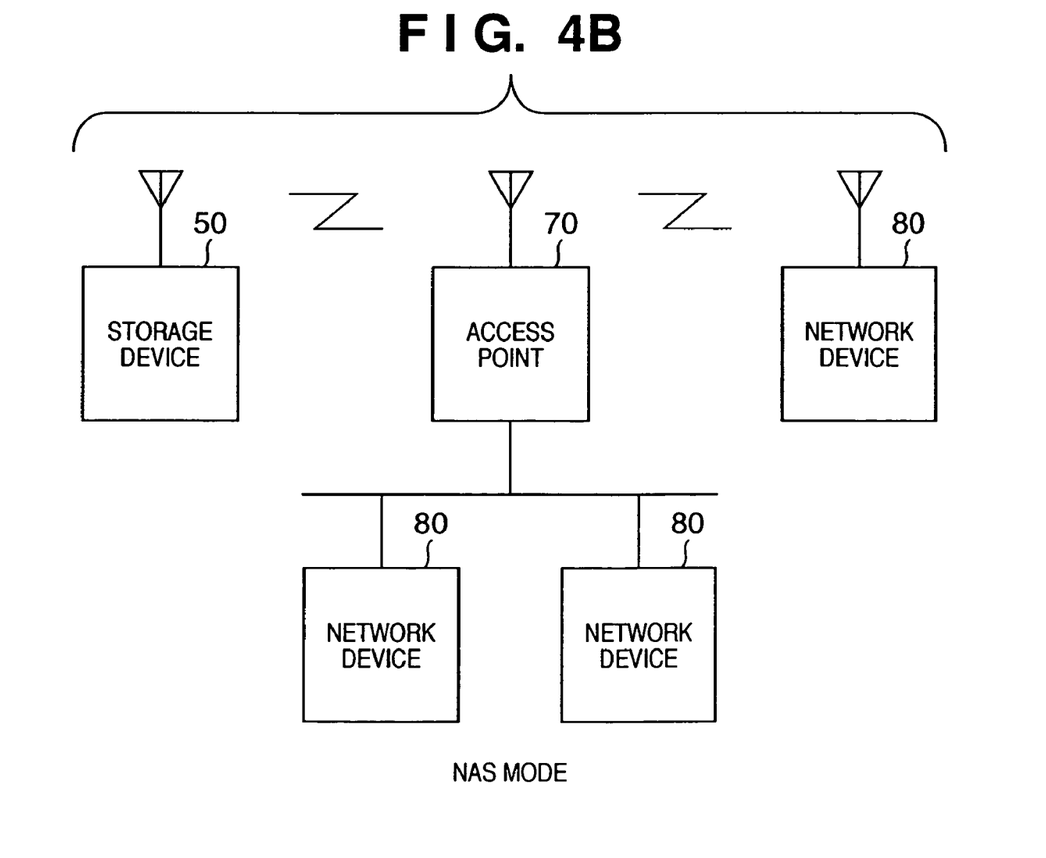

First, an example of modes of use of a storage device 50 according to the second embodiment will be described with reference to FIGS. 4A and 4B. FIG. 4A is a diagram illustrating an example in which the storage device 50 is utilized in a DAS (Direct Attached Storage) mode, and FIG. 4B is a diagram illustrating an example in which the storage device 50 is utilized in an NAS (Network Attached Storage) mode.

The storage device 50, which has the DAS mode and the NAS mode, implements these modes selectively. The DAS mode is an operating mode in which the storage device 50 is caused to operate as a storage device dedicated to a video apparatus 60. The DAS mode is an operating mode selected automatically and implemented in accordance with a mode changeover command transmitted from the video apparatus 60 to the storage device 50. The NAS mode is an operating mode in which the storage device 50 is connected to a network automatically via an access point 70 and caused to operate as a file server. In other words, the NAS mode is an operating mode in which the storage device 50 is caused to operate as NAS (Network Attached Storage). The NAS mode is an operating mode selected automatically and implemented in accordance with the mode changeover command transmitted from the video apparatus 60 to the storage device 50. When the storage device 50 is in the NAS mode, network devices 80 are capable of utilizing the storage device 50 via the access point 70. The video apparatus 60 is an apparatus such as a digital video recorder or digital video camera. When the storage device 50 has been connected to the video apparatus 60, digital video data from the video apparatus 60 is stored in the storage device 50. Further, the video apparatus 60 sends the storage device 50 the mode changeover command, which is control information for switching the operating mode of the storage device 50 to the DAS mode or NAS mode. The access point 70 is one in a wireless network such as a wireless LAN.

The main structure of the storage device 50 according to the second embodiment will now be described with reference to FIG. 5.

Figure 5:
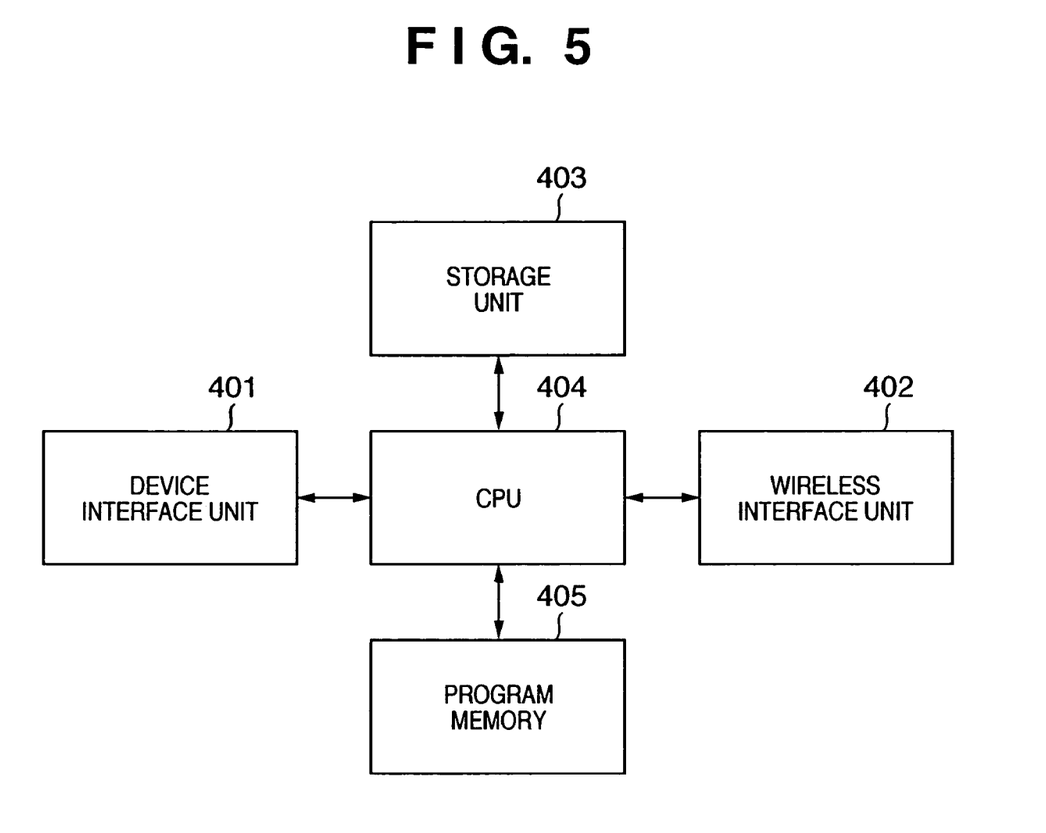
FIG. 5 is a block diagram illustrating the main structure of a storage device according to the second embodiment.

In FIG. 5, a device interface unit 401 makes it possible to communicate with the video apparatus 60, and a wireless interface unit 402 makes it possible to communicate with the access point 70 in the wireless network. A storage unit 403 executes processing for writing digital video data obtained from the device interface unit 401 or wireless interface unit 402 to a randomly accessible storage medium, and processing for supplying digital video data, which has been read out of a randomly accessible storage medium, to the device interface unit 401 or wireless interface unit 402. The storage unit 403 is also capable of providing the function of a file server via the wireless interface unit 402. A CPU (Central Processing Unit) 404 controls the functions of the storage device 50 and performs management in accordance with a program stored in a program memory 405.

Figure 6:
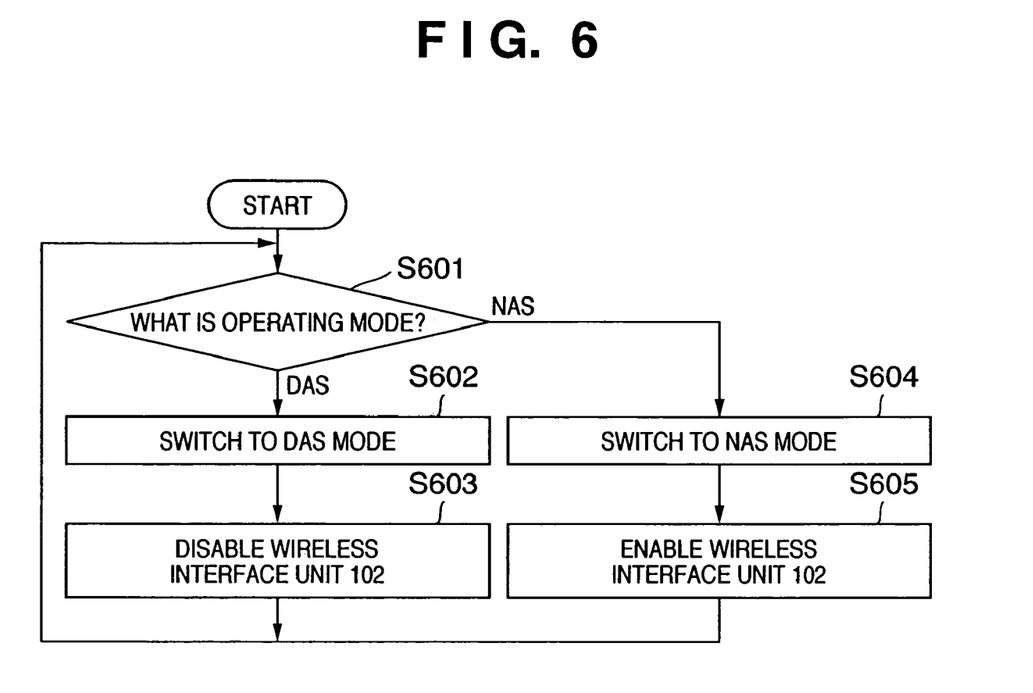
FIG. 6 is a flowchart illustrating operating-mode changeover processing executed in the storage device of the second embodiment.

Processing for changing over the operating mode implemented in the storage device 50 will now be described with reference to the flowchart of FIG. 6. It should be noted that in processing for changing over the operating mode, it is assumed that the processing in the CPU 401 is executed in accordance with the program stored in the program memory 405.

Step S601: The device interface unit 401 receives the mode changeover command transmitted from the video apparatus 60 to the storage device 50 and supplies the received mode changeover command to the CPU 404. The latter investigates the content of the mode changeover command supplied by the device interface unit 401 and switches the operating mode of the storage device 50 to the DAS mode or NAS mode. If the mode is switched to the DAS mode, then control proceeds to step S602. On the other hand, if the mode is switched to the NAS mode, control proceeds to step S604.

Step S602: The CPU 404 switches the operating mode of the storage device 50 to the DAS mode.

Step S603: The CPU 404 disables the function of the wireless interface unit 402 and disconnects the storage device 50 from the network. The CPU 404 then controls the storage device 50 in such a manner that the storage device 50 will operate as a storage device exclusively for the video apparatus 60.

Step S604: The CPU 404 switches the operating mode of the storage device 50 to the NAS mode.

Step S605: The CPU 404 enables the function of the wireless interface unit 402 and connects the storage device 50 to the network via the access point 70. The CPU 404 then controls the storage device 50 in such a manner that the storage device 50 will operate as a file server connected directly to the network. By execution of such processing, each network device 80 is capable of utilizing the storage device 50 via the access point 70, desired digital video data can be read out of the storage unit 403, and desired digital video data can be written to the storage unit 403.

Thus, in accordance with the storage device 50 of the second embodiment, the storage device 50 can operate as a storage device dedicated to the video apparatus 60 and also as a file server connected directly to a network.

Further, in accordance with the storage device 50 of the second embodiment, the operating mode of the storage device 50 can be switched to the DAS mode or NAS mode in accordance with a mode changeover command transmitted from the video apparatus 60. As a result, it is possible to switch automatically between an operating mode in which the storage device operates as a storage device dedicated to the video apparatus 60 and an operating mode in which the storage device operates as a file server connected directly to a network.

Further, in accordance with the storage device 50 in the second embodiment, the device can be connected to a network using the wireless interface unit 402. As a result, the storage device 50 can be connected to the network in simple fashion.

Further, in accordance with the storage device 50 in the second embodiment, the storage device 50 can operate as a file server connected directly to a network when the NAS mode is in effect. This means that digital video data that the video apparatus 60 has stored in the storage device 50 can be supplied to a network device that requests this data.

It should be noted that in the storage device 50 of the second embodiment may be so adapted that the area used by the storage unit 403 is split into areas, with a certain area being used when the DAS mode is in effect and another area being used when the NAS mode is in effect. More specifically, the storage unit 403 is divided up into a plurality of areas of use. If the DAS mode is in effect, then an area A, for example, is used. If the DAS mode has been switched to the NAS mode, then the area used is switched from area A to area B. The area B may be further divided into a plurality of areas of use and may be managed on a per-network-device basis.

Thus, in accordance with the present invention, it is possible to provide a storage device that can operate as a storage device exclusively for a video apparatus and also as a file server.

OTHER EMBODIMENTS

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A storage device comprising:
a first interface unit capable of connecting to an external apparatus;
a second interface unit capable of connecting to a network; and
a control unit which controls the storage device,
wherein the control unit determines whether the external apparatus is connected to the first interface unit,
the control unit selects a first operating mode where the storage device is used by the external apparatus and the second interface unit is disabled, if the control unit determines that the external apparatus is connected to the first interface unit, and
the control unit selects a second operating mode where the storage device operates as a file server and the second interface unit is enabled, if the control unit determines that the external apparatus is not connected to the first interface unit.

2. The storage device according to claim 1, wherein the second interface unit is capable of connecting to the network by wireless.

3. The storage device according to claim 1, wherein the external apparatus is one of a digital video recorder and a digital video camera.

4. The storage device according to claim 1, wherein the control unit determines whether the external apparatus is connected to the first interface unit, even if the second operating mode is selected.

5. A method of controlling a storage device, the storage device including a first interface unit configured to connecting to an external apparatus, a second interface unit configured to connecting to a network, and a control unit which controls the storage device, the method comprising the steps of:
determining whether the external apparatus is connected to the first interface unit;
selecting a first operating mode where the storage device is used by the external apparatus and the second interface unit is disabled, if it is determined that the external apparatus is connected to the first interface unit; and
selecting a second operating mode where the storage device operates as a file server and the second interface unit is enabled, if it is determined that the external apparatus is not connected to the first interface unit.

6. The method according to claim 5, wherein the second interface unit is configured to connecting to the network by wireless.

7. The method according to claim 5, wherein the external apparatus is one of a digital video recorder and a digital video camera.

8. The method according to claim 5, further comprising a step of determining whether the external apparatus is connected to the first interface unit, even if the second operating mode is selected.

* * * * *

UNITED STATES PATENT AND TRADEMARK OFFICE
CERTIFICATE OF CORRECTION

PATENT NO. : 7,181,552 B2 Page 1 of 1
APPLICATION NO. : 10/774862
DATED : February 20, 2007
INVENTOR(S) : Ohnishi It is certified that error appears in the above-identified patent and that said Letters Patent is hereby corrected as shown below:

In Column 8, Line 23, change "capable of connecting" to --configured to connect--;

Line 25, change "capable of connecting" to --configured to connect--;

Line 41, change "capable of connecting" to --configured to connect--; and

In Column 9, Line 2, change "capable of connecting" to --configured to connect--.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,181,552 B2 Page 1 of 1
APPLICATION NO. : 10/774862
DATED : February 20, 2007
INVENTOR(S) : Ohnishi It is certified that error appears in the above-identified patent and that said Letters Patent is hereby corrected as shown below:

In Column 8, Line 23, change "capable of connecting" to --configured to connect--;

Line 25, change "capable of connecting" to --configured to connect--;

Line 41, change "capable of connecting" to --configured to connect--; and

In Column 9, Line 2, change "capable of connecting" to --configured to connect--.

Signed and Sealed this

Twenty-first Day of August, 2007

JON W. DUDAS
*Director of the United States Patent and Trademark Office*